(12) United States Patent
Aikawa et al.

(10) Patent No.: US 6,606,385 B1
(45) Date of Patent: Aug. 12, 2003

(54) DATA ENCRYPTING/DECRYPTING CONVERSION METHODS AND APPARATUSES AND DATA COMMUNICATION SYSTEM ADOPTING THE SAME

(75) Inventors: Makoto Aikawa, Yokohama (JP); Kazuo Takaragi, Ebina (JP); Hiroyuki Koreeda, Fujisawa (JP); Manabu Sasamoto, Yokohama (JP); Hiroo Okamoto, Yokohama (JP); Takaharu Noguchi, Yokohama (JP); Soichi Furuya, Fukuoka (JP); Shigeru Hirahata, Kanagawa-ken (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/130,529

(22) Filed: Aug. 4, 1998

(30) Foreign Application Priority Data

Aug. 7, 1997 (JP) .............................. 9-213327

(51) Int. Cl.[7] ................................ H04K 1/00
(52) U.S. Cl. ....................................... 380/28
(58) Field of Search .................. 380/29, 37, 284; 713/168; 705/58

(56) References Cited

U.S. PATENT DOCUMENTS

| 4,255,811 A | * | 3/1981 | Adler ........................... 380/37 |
| 4,731,840 A | | 3/1988 | Mniszewski et al. |
| 4,797,920 A | | 1/1989 | Stein |
| 4,850,019 A | * | 7/1989 | Shimizu et al. ............... 380/29 |
| 5,222,139 A | | 6/1993 | Takaragi et al. |
| 5,301,247 A | | 4/1994 | Rasmussen et al. |
| 5,724,428 A | * | 3/1998 | Rivest .......................... 380/37 |
| 6,002,772 A | * | 12/1999 | Saito ............................. 705/58 |

FOREIGN PATENT DOCUMENTS

| EP | 237 805 | 9/1987 |
| JP | 1-276189 | 11/1989 |
| WO | 97/22192 | 6/1997 |

OTHER PUBLICATIONS

B. Schneier, "Applied Cryptography", $2^{nd}$ Ed., 1996, section 12.2, pp. 270–278.*
Rivest, R.L., "The RC5 Encryption Algorithm," Dr. Dobb's Journal, U.S. San Mareo, CA, vol. 220, Jan. 1, 1995, pp. 146–148.
The RC5 Encryption Algorithm, MIT Laboratory for Computer Science, Ronald Rivest, pp. 86–96.
Improved Differential Attacks on RC5, Lars R. Knudsen, pp. 216–228.

* cited by examiner

*Primary Examiner*—Matthew Smithers
(74) *Attorney, Agent, or Firm*—Mattingly, Stanger & Malur, P.C.

(57) ABSTRACT

Encrypting/decrypting conversion method and apparatus capable of controlling dynamically cyclic shift independent of data to undergo encrypting/decrypting conversion includes two or more different fixed circulating shift processing means for shifting cyclically the data by a fixed bit number leftward or rightward, a cyclic shift processing selecting means for selecting fixed cyclic shift processing means. The selecting sequence determined by the cyclic shift processing means is determined on the basis of data for determining the shift number selecting sequence.

21 Claims, 17 Drawing Sheets

| G1, G2, G3 | CYCLIC SHIFT NUMBER S |
|---|---|
| 00 | 2 |
| 01 | 8 |
| 10 | 14 |

| P1 | P2 | INTERNAL STATUS |
|----|----|----|
| 0 | 0 | Q0 |
| 0 | 1 | Q1 |
| 1 | 0 | Q2 |
| 1 | 1 | Q0 |

FIG. 10
(case 1)

| | BINARY |
|---|---|
| L1 | 0000 0000 0000 0000 0000 0000 0000 0000 |
| R1 | 0000 0000 0000 0000 0000 0000 0000 0000 |
| X2 = X1 <<< 2 + X1 +1 | 0000 0000 0000 0000 0000 0000 0000 0001 |
| X3 = X2 <<< 8 + X2 | 0000 0000 0000 0000 0000 0000 0000 0001 |
| X5 = X4 <<<14 + X4 | 0000 0000 0000 0000 0000 0000 0000 0001 |
| L2 = X5 + R1 | 0000 0000 0000 0000 0000 0000 0000 0001 |
| R2 = L1 | 0000 0000 0000 0000 0000 0000 0000 0000 |
| X2 = X1 <<< 2 + X1 +1 | 0000 0000 0001 0100 0101 0101 0000 0110 |
| X3 = X2 <<<14 + X2 | 0101 0010 0010 1000 0101 0101 0101 0110 |
| X5 = X4 <<< 8 + X4 | 1101 0101 0100 0001 0001 1011 1010 1000 |
| L3 = X5 + R2 | 1101 0101 0100 0001 0001 1011 1010 1000 |
| R3 = L2 | 0000 0000 0100 0000 0100 0001 0000 0001 |
| X2 = X1 <<< 8 + X1 +1 | 0001 1101 0100 0011 0010 1100 0111 1110 |
| X3 = X2 <<< 2 + X2 | 1001 0010 0110 1111 0010 1101 0111 0110 |
| X5 = X4 <<<14 + X4 | 0100 1000 1001 0000 0111 1011 1100 0010 |
| L4 = X5 + R3 | 0100 1000 1101 0100 1000 0001 1011 0011 |
| R4 = L3 | 1101 0101 0100 0001 0001 1011 1010 1000 |

4001
4002
4003

FIG. 11
(case 2)

| | BINARY |
|---|---|
| L1 | 0000 0000 0000 0000 0000 0000 0000 0000 |
| R1 | 0000 0000 0000 0000 0000 0000 0000 0000 |
| X2 = X1 <<< 8 + X1+1 | 0000 0000 0000 0000 0000 0000 0000 0001 |
| X3 = X2 <<< 14 + X2 | 0000 0000 0000 0001 0000 0000 0000 0001 — 5001 |
| X5 = X4 <<< 2 + X4 | 0000 0000 0001 0100 0100 0000 0000 0101 |
| L2 = X5 + R1 | 0000 0000 0001 0100 0100 0000 0000 0101 |
| R2 = L1 | 0000 0000 0000 0000 0000 0000 0000 0000 |
| X2 = X1 <<< 14 + X1+1 | 0101 0000 0000 0010 1100 0000 0000 0110 |
| X3 = X2 <<< 2 + X2 | 1001 0000 0000 1100 1000 0000 0001 1111 |
| X5 = X4 <<< 8 + X4 | 1001 1100 1000 1100 1001 1111 1010 1111 |
| L3 = X5 + R2 | 1001 1100 1000 1100 1001 1111 1010 1111 |
| R3 = L2 | 0000 0000 0001 0100 0100 0000 0000 0101 — 5002 |
| X2 = X1 <<< 14 + X1+1 | 1100 0100 0111 1111 1100 0110 1101 0011 |
| X3 = X2 <<< 8 + X2 | 0011 1100 0000 1111 1100 0101 1010 1001 0111 |
| X5 = X4 <<< 2 + X4 | 0011 0000 1111 1111 1100 0100 1111 0011 |
| L4 = X5 + R3 | 0011 0000 1111 1111 1100 0100 1111 1000 |
| R4 = L3 | 1001 1100 1000 1100 1001 1111 1010 1111 — 5003 |

TokenAB = Text3 ‖ eKAB(RA ‖ RB ‖ IB ‖ Text2)

TokenBA = Text5 ‖ eKAB(RB ‖ RA ‖ Text4)

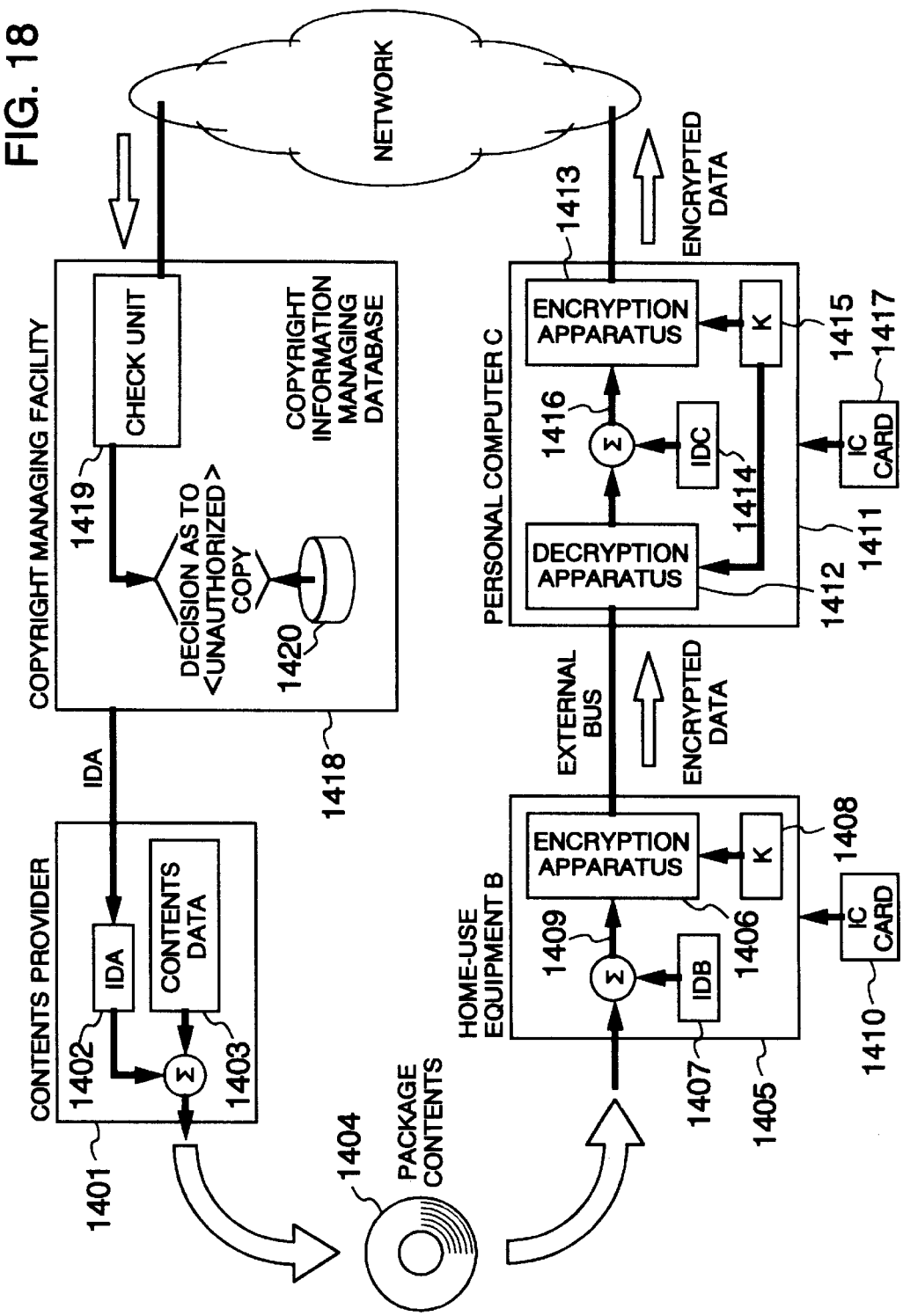

DATA ENCRYPTING/DECRYPTING CONVERSION METHODS AND APPARATUSES AND DATA COMMUNICATION SYSTEM ADOPTING THE SAME

BACKGROUND OF THE INVENTION

The present invention relates to encryption/decryption techniques for encrypting/decrypting digital data transferred among computers, home-use-destined electric/electronic equipment and the like.

In the digital home-use-destined electric/electronic equipment promising further development in the future, the encryption/decryption technology is indispensably required for preventing or disenabling unauthorized or illegal copying of digital data.

As the encryption technology known heretofore there has already been proposed what is known as the RC5 encryption algorithm in which data-dependent cyclic shift operation (also called end-around, circular or ring shift operation) is adopted, as is disclosed in R. L. Rivest: "The RC5 Encryption Algorithm", FAST SOFTWARE ENCRYPTION, 2nd International Workshop, Springer-Verlag, (1995). The RC5 encryption algorithm is designed such that processed data length (i.e., the length of data to be processed) of w bits, secret key length of b bytes and processing round number r are variable. For having better understanding of the concept underlying the present invention, the RC5 encryption algorithm will be explained below in some detail.

For the text data which has not undergone any encrypting conversion processing (hereinafter referred to simply as the plain-text data) and which is given by "L[0] and R[0]", where L[0] represents more significant w/2 bits of the processed data length of w bits, and R[0] represents least significant w/2 bits thereof, there can be obtained through the RC5 encryption algorithm an encrypted text "L[2r+1], R[2r+1]" which can be derived through the procedure defined by the following expressions:

$$L[1]=L[0]+S[0],$$

$$R[1]=R[0]+S[0],$$

$$L[N+1]=R[N],$$

where $1 \leq N \leq 2r$, and $$R[N+1]=((L[N] \ EOR \ R[N]) <<< R[N]) + S[N+1],$$

where $1 \leq N \leq 2r$.

In the above expressions, the repetition represented by "$1 \leq N \leq 2r$" is illustrated for "N" in FIG. 23 of the accompanying drawings. In conjunction with the above definition, arithmetic expression "A +B" in general represents a remainder resulting from division of a sum of "A" and "B" by the x-th power of "2", and operation symbol "EOR" represents an exclusive-OR on a bit-by-bit basis. Further, expression "x<<<y" in general represents arithmetic operation of shifting repetitionally "x" to the left (leftward shift) by least significant log(w) bits of "y". According to the RC5 encryption algorithm, twice repetition of the arithmetic operation shown in FIG. 23 is referred to as one stage operation. The encrypted text can be generated by repeating the one-stage operation r times.

Major features of the RC5 encrypting algorithm can be seen in that the length of the secret key is variable on a user-by-user basis and the cyclic shift can be varied or changed dynamically. However, because such algorithm structure is adopted that the dynamic change of the cyclic shift depends on the data for encryption the RC5 encryption algorithm suffers a drawback of not being sufficiently hard against the selective plain-text attack, one of the cryptanalysis methods. For more particulars in this respect, reference should be made to Lar R. Knudsen, Willi Meier: "IMPROVED DIFFERENTIAL CRYPTANALYSIS ON RC5", Advances in Cryptology-CRYPTO'96, Springer-Verlag, 1996.

SUMMARY OF THE INVENTION

In the light of the state of the art described above, it is an object of the present invention to provide encrypting conversion method and apparatus which are capable of controlling dynamically the cyclic shift independent of data for conversion and additionally capable of realizing the encrypting conversion with highly enhanced randomness with a simplified system configuration.

Another object of the present invention is to provide method and system for decrypting the encrypted text.

Yet another object of the present invention is to provide a data communication system in which the encrypting/decrypting conversion techniques taught by the invention are adopted.

In view of the above and other objects which will become apparent as the description proceeds, there is provided an encryption system or apparatus for generating a encrypted text data of a predetermined length as an encrypted block from a plain-text data and key or keys as inputted, which apparatus includes:

(1) at least two fixed cyclic shift processing modules for cyclically shifting data leftward or rightward, (2) a cyclic shift processing selecting module for selecting the fixed cyclic shift processing means, and (3) a cyclic shift processing sequence determining module for determining an order or sequence for the selection of the cyclic shift processing selecting module on the basis of data for determining the shift number selecting sequence.

Thus, there is provided according to an aspect of the present invention an encrypting conversion apparatus which receives as inputs thereto at least one key and plain-text data to thereby output encrypted text data, which apparatus can be implemented in hardware fashion or software fashion and includes a cyclic shift processing module for determining a shift number on the basis of data for determining a shift number selecting sequence, a module for dividing inputted plain-text data into first data and second data and setting the first data as data L[1] while setting the second data as data R[1], at least one stage of an encrypting conversion processing module for receiving as inputs thereto data L[N] and R[N] to thereby output data L[N+1] and data R[N+1], wherein the encrypting conversion processing module is so arranged as to perform at least once for the data L[N] a conversion processing by using the key and a cyclic shift processing by means of the cyclic shift processing module, respectively, to thereby generate data X and wherein a value derived from arithmetic operation of the data R[N] and the data X is set as the data L[N+1] while the data L[N] being set as the data R[N+1], and a module for outputting a combination of two output data from a final stage of the encrypting conversion processing module as an encrypted text.

In a mode for carrying out the invention, the cyclic shift processing module may be so arranged as to include at least two different fixed cyclic shift processing modules each for performing cyclic shift by a fixed number of bits leftward or alternatively rightward, a cyclic shift processing selecting module for selecting the fixed cyclic shift processing module, and a cyclic shift processing sequence determining module for determining a selecting sequence for the cyclic shift processing selecting modules on the basis of data for determining the shift number selecting sequence.

In another mode for carrying out the invention, the data for determining the shift number selecting sequence may be generated on the basis of the aforementioned key.

Further, according to another aspect of the present invention, there is provided a decrypting conversion apparatus which receives as inputs thereto at least one key and encrypted text data to thereby output plain-text data, which apparatus can be implemented hardware-wise or software-wise and includes a cyclic shift processing module for determining a shift number on the basis of data for determining a shift number selecting sequence, a module for dividing inputted encrypted text data into first data and second data and setting the first data as data L[1] while setting the second data as data R[1], at least one stage of a decrypting conversion module for receiving as inputs thereto data L[N] and R[N] to thereby output data L[N+1] and data R[N+1], wherein the decrypting conversion module is so arranged as to perform at least once for the data R[N] a conversion processing by using the key and a cyclic shift processing by means of the cyclic shift processing module, respectively, to thereby generate data X and wherein a value derived from arithmetic operation of the data L[N] and the data X is set as the data R[N+1] while the data R[N] being set as the data L[N+1], and a module for outputting a combination of two output data from final stage of the encrypting conversion module as a plain-text.

In a mode for carrying out the invention, the cyclic shift processing module may be so arranged as to include at least two different fixed cyclic shift processing modules each for performing cyclic shift by a fixed number of bits leftward or alternatively rightward, a cyclic shift processing selecting module for selecting the fixed cyclic shift processing module, and a cyclic shift processing sequence determining module for determining a selecting sequence for the cyclic shift processing selecting modules on the basis of data for determining the shift number selecting sequence.

In a further mode for carrying out the invention, the data for determining the shift number selecting sequence may be generated on the basis of the aforementioned key.

By virtue of the arrangements described above, the cyclic shift can be dynamically controlled independent of the data for conversion, and the encrypting conversion as well as the decrypting conversion can be realized with highly enhanced randomness with a simple system configuration.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which:

FIG. 10 is a view for illustrating the effect of the cyclic shift for data diffusion (case #1) in the encrypting conversion process;

FIG. 11 is a view for illustrating the effect of the cyclic shift for data diffusion (case #2) in the encrypting conversion process;

FIG. 18 is a block diagram showing a package contents distributing/circulating system according to a yet another embodiment of the present invention;

DESCRIPTION OF THE PREFERRED EMBODIMENTS

The present invention will be described in detail in conjunction with what is presently considered as preferred or typical embodiments thereof by reference to the drawings.

Embodiment 1

Figure 1:
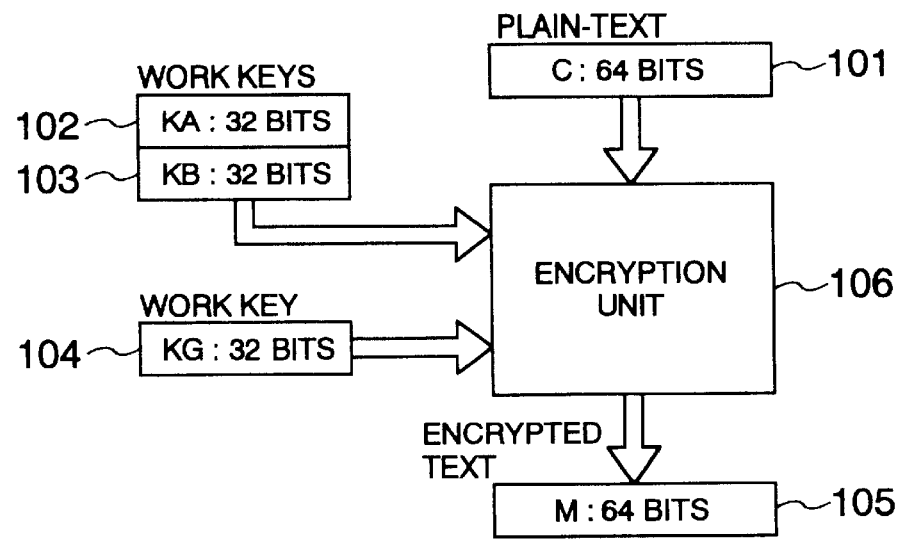
FIG. 1 is a block diagram showing schematically and generally an arrangement of an encrypting conversion apparatus according to an embodiment of the present invention.

The encryption/decryption techniques according to the present invention will be described by reference to FIG. 1 which is a block diagram showing schematically and generally an arrangement of an encrypting conversion apparatus according to an embodiment of the present invention. Referring to FIG. 1, a clear or plain text (C) 101 is inputted to an encryption unit 106 together with a work key (KA) 102 of 32 bits, a work key (KB) 103 of 32 bits and a work key (KG) 104 of 30 bits. After enciphering or encrypting conversion, an encrypted text (M) 105 of 64 bits is outputted from the encryption unit 106. At this juncture, it should be mentioned that the work key (KG) 104 may also be referred to as the algorithm key because this key serves for determining the algorithm to be realized in the encryption unit 106.

Figure 2:
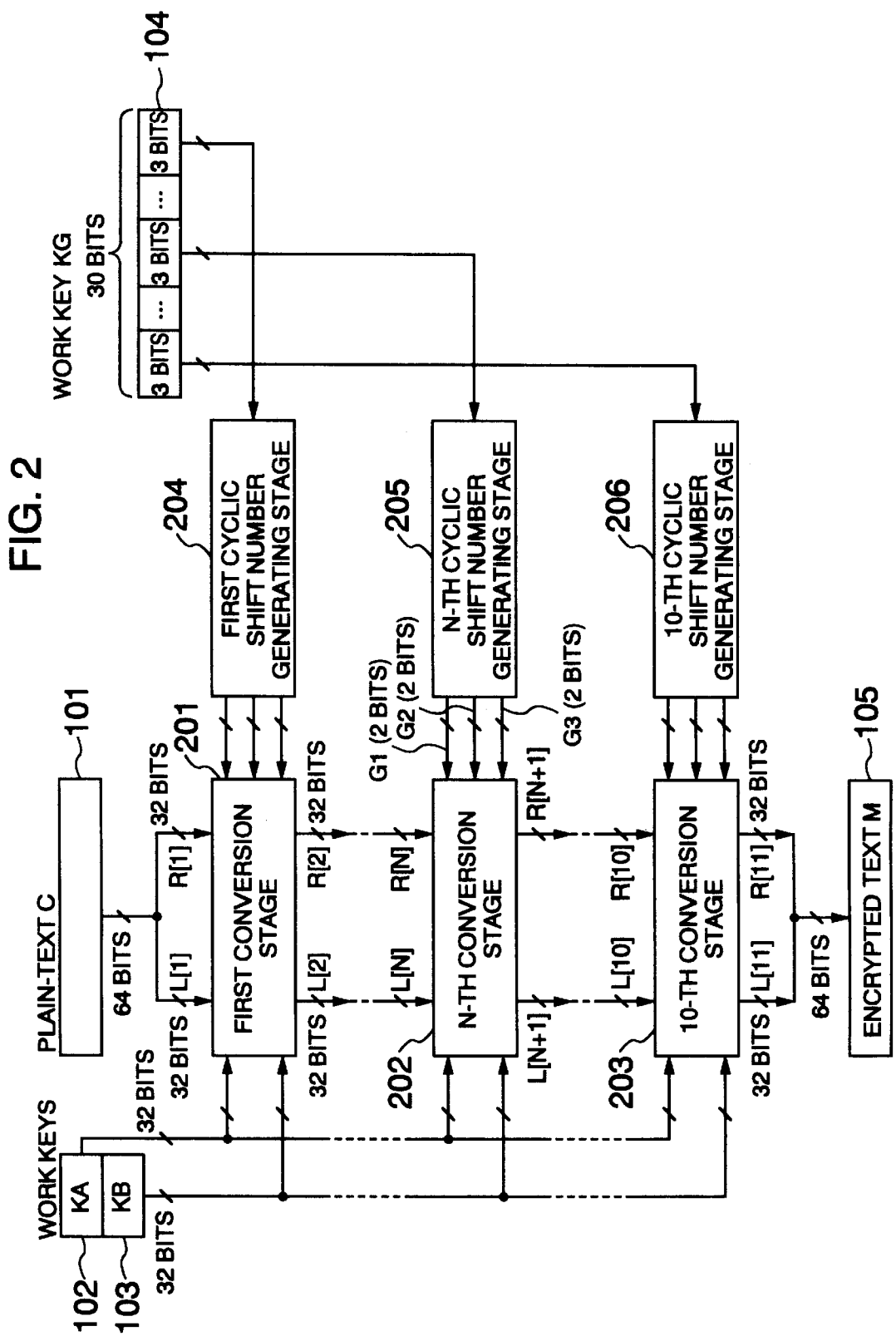
FIG. 2 is a block diagram showing in detail a configuration of an encryption unit shown in FIG. 1.

FIG. 2 is a block diagram showing in detail a configuration of the encryption unit 106 shown in FIG. 1. The plain-text (C) 101 of 64 bits inputted to the encryption unit 106 is separated or divided into more significant 32-bits data L[1] and least significant 32-bit data R[1], whereon both the data undergo repetitionally encrypting conversions at a first conversion stage 201 to a ten-th conversion stage 203, respectively. Finally, both the finally obtained more significant 32-bit data L[11] and least significant 32-bit data R[11] undergone the encrypting conversions mentioned above are combined together, whereby the encrypted text (M) 105 is generated to be outputted from the encryption unit 106. The encrypting conversion processing performed at a given or N-th conversion stage 202 is determined by control signals G1, G2 and G3 which are outputted from an N-th cyclic shift number generating stage 205 (where N represents an arbitrarily given natural number) to which 3-bit values KG{3N−1}, KG{3N−2} and KG{3N−3} of the work key (KA) 102, the work key (KB) 103 and the work key (KG) 104, respectively, are inputted. Parenthetically, KG{x} in general represents the x-th bit of the work key KG.

Figure 3:
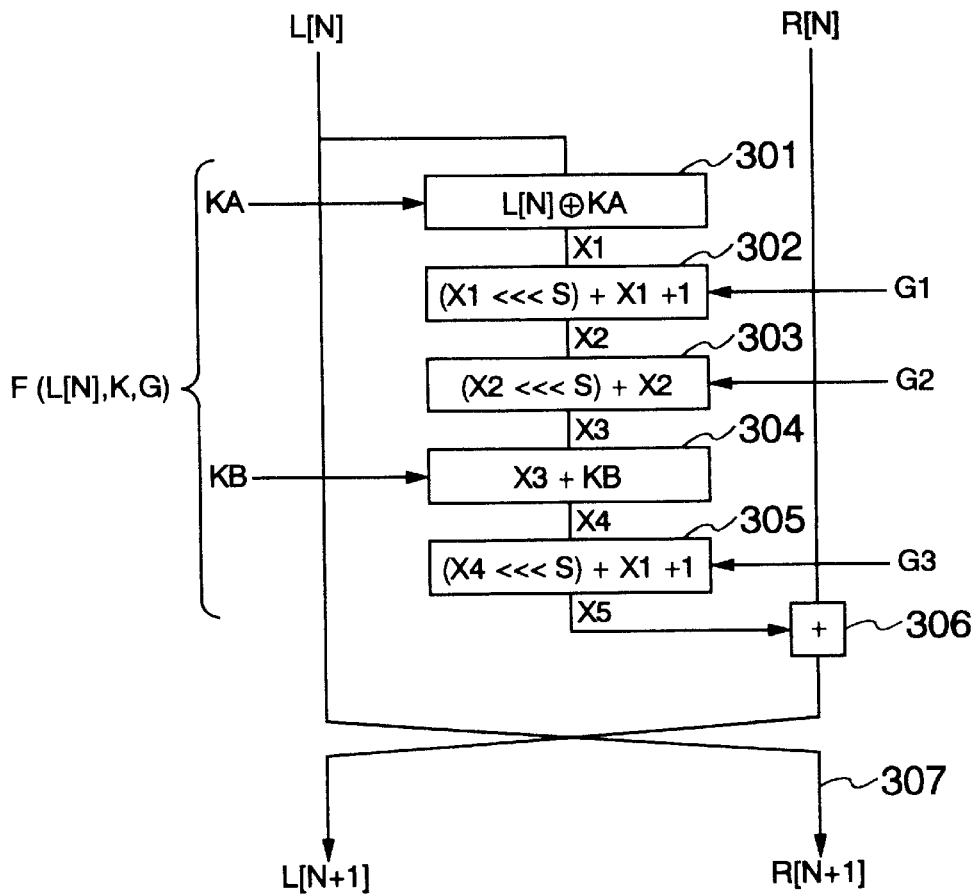
FIG. 3 is a view for illustrating conversion processing performed at an N-th conversion stage shown in FIG. 2.
Figures 4, 5:
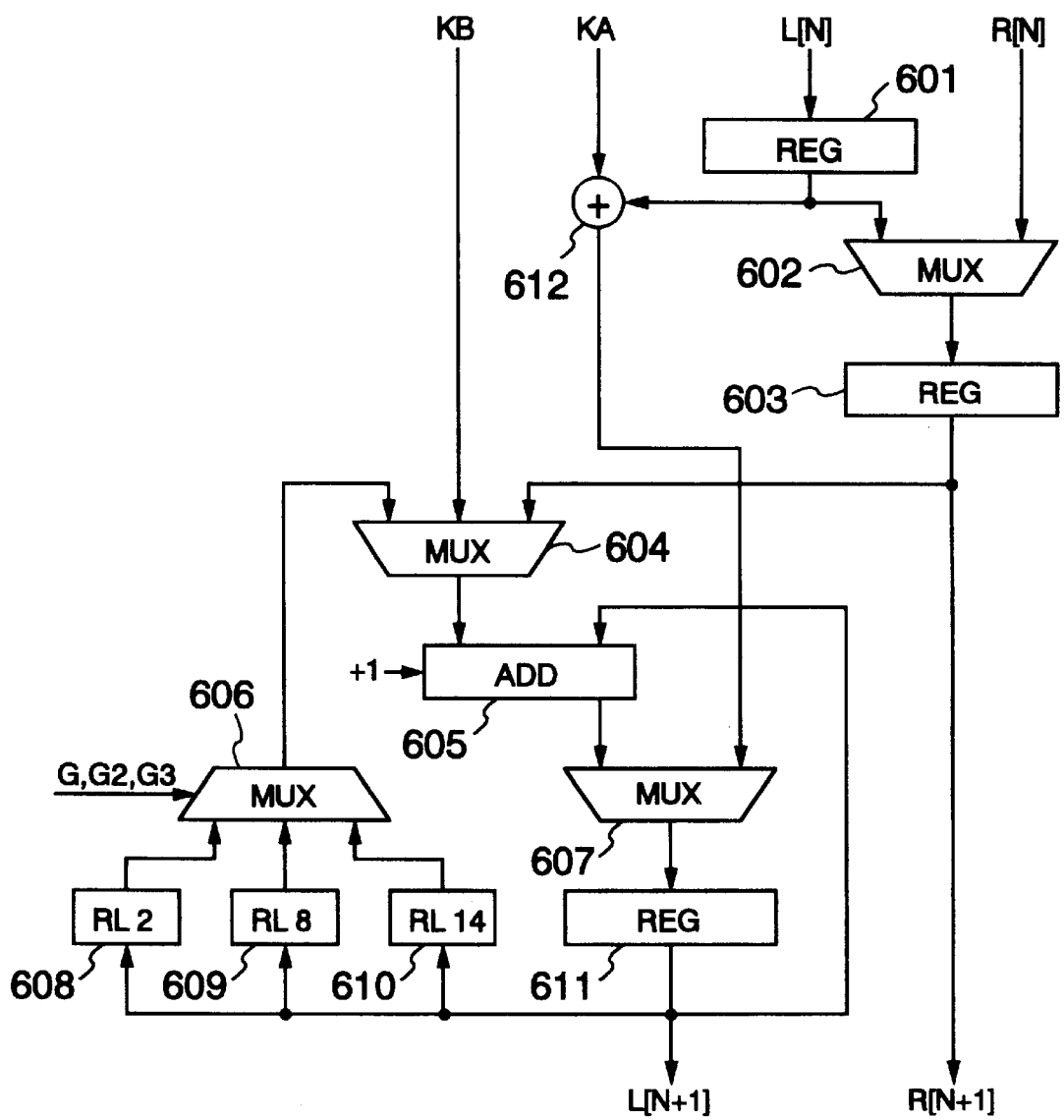
FIG. 4 is a view showing relations between control signals G1, G2 and G3 and a cyclic shift number S in the processing shown in FIG. 3.
FIG. 5 is a circuit diagram showing a circuit configuration for realizing encrypting conversion through the processing shown in FIG. 3.

FIG. 3 is a view for illustrating, by way of example only, the conversion processing performed at the N-th conversion stage 202 shown in FIG. 2. Further, FIG. 4 is a view for illustrating operation involved in the conversion processing shown in FIG. 3. More specifically, FIG. 4 shows relations between the control signals G1, G2 and G3 and the cyclic shift number S. The encryption process according to the instant embodiment of the invention is realized by a transposition processing for effectuating the cyclic shift of concerned data itself and substitution processing including logic operation and arithmetic operation with other data. The processing contents illustrated in FIG. 3 will be described in order.

(1) An exclusive-OR ($\oplus$) of "L(N)" (i.e., most significant 32-bit input data to the N-th conversion stage) and the work key KA is determined and denoted by "X1". This corresponds to a processing 301 shown in FIG. 3. Thus, the processing 301 can be expressed as follows:

$$X1 = L[N] \, EOR \, KA$$

At this juncture, it is presumed throughout the description that general arithmetic expression "A EOR B" represents an exclusive-OR of "A" and "B".

(2) On the basis of a 2-bit output value G1 derived at the N-th cyclic shift number generating stage 205, the cyclic shift number S is determined in accordance with the relevant relation shown in FIG. 4. Subsequently, a value resulting from the leftward cyclic shift of the exclusive-OR X1 by the shift number S bits is added with "X1" and "1". The sum obtained from this addition is represented by "X2". This corresponds to the processing denoted by reference numeral 302 in FIG. 3. Expressing mathematically, $$X2 = (X1 <<< S) + X1 + 1$$

In this conjunction, it is presumed throughout the specification that the expression "A<<<B" in general represents that "A" undergoes cyclic shift by "B" bits leftwards. Equally, it is presumed throughout the description that the arithmetic expression "A+B" in general represents a remainder resulting from division of the result of addition of "A" and "B" by the 32nd power of "2". This operation "A+B" will also be referred to simply as the addition.

(3) on the basis of a 2-bit output value G2 derived at the N-th cyclic shift number generating stage 205, the cyclic shift number S is determined in accordance with the relevant relation shown in FIG. 4. Subsequently, a value resulting from the leftward cyclic shift of "X2" by the shift number S bits is added with "X2". The sum obtained from this addition is represented by "X3". This corresponds to the processing denoted by reference numeral 303 in FIG. 3. Expressing mathematically, $$X3 = (X2 <<< S) + X2$$

(4) Addition between "X3" and the work key KB is performed, the result of which is represented by "X4". This corresponds to the processing denoted by reference numeral 304 in FIG. 3. Thus, expressing mathematically, $$X4 = X3 + KB$$

(5) On the basis of a 2-bit output value G3 derived from the N-th cyclic shift number generating stage 205, the cyclic shift number S is determined in accordance with the relevant relation shown in FIG. 4. Subsequently, a value resulting from the leftward cyclic shift of "X4" by S bits is added with "X4". The sum obtained from this addition is represented by "X5". This corresponds to the processing denoted by reference numeral 305 in FIG. 3. Expressing mathematically, $$X5 = (X4 <<< S) + X4$$

(6) The result of the addition of "X5" and "R[N]" (i.e., least significant 32-bit input data to the N-th conversion stage) is outputted from the N-th conversion stage 202 as the more significant 32-bit output data L[N+1]. This corresponds to the processing denoted by reference numeral 306 in FIG. 3. Expressing mathematically, $$L[N+1] = X5 + R[N]$$

(7) The more significant 32-bit input data L[N] of the N-th conversion stage is converted to the least significant 32-bit output data R[N+1] of the N-th conversion stage 202. This corresponds to the processing denoted by reference numeral 307 in FIG. 3. Expressing mathematically, $$R[N+1] = L[N]$$

When the encrypting conversion processing (1) to (5) described above are summarized in the form of a function "F(L[N], K, G)", the processing performed at the N-th conversion stage 202 can be stated as follows:

$$L[N+1] = R[N] + F(L[N], K, G) \quad R[N+1] = L[N]$$

In the foregoing, the encrypting conversion processing according to the invention have been described in detail.

Next, description will be directed to a circuit configuration of the encrypting conversion apparatus.

FIG. 5 is a circuit diagram showing a circuit configuration of the N-th conversion stage 202 according to the instant embodiment of the invention as implemented in hardware. Referring to the figure, the circuit now under consideration is comprised of registers 601, 603 and 611, an adder 605, an exclusive-OR circuit 612, two-input multiplexers 602 and 607, three-input multiplexers 604 and 606, a leftward 2-bit cyclic shifter 608, a leftward 8-bit cyclic shifter 609 and a leftward 14-bit cyclic shifter 610. The data width is of 32 bits without exception.

Execution of the conversion processions shown in FIG. 3 can be completed within six cycles by controlling the multiplexers 602, 604, 606 and 607 so that the processions designated by the reference numerals 301 to 306 in FIG. 3 can be realized. The three-input multiplexer 606 designed for switching the cyclic shifter is controlled by the control signals G1, G2 and G3 outputted sequentially from the N-th cyclic shift number generating stage 205.

Figures 6, 8:
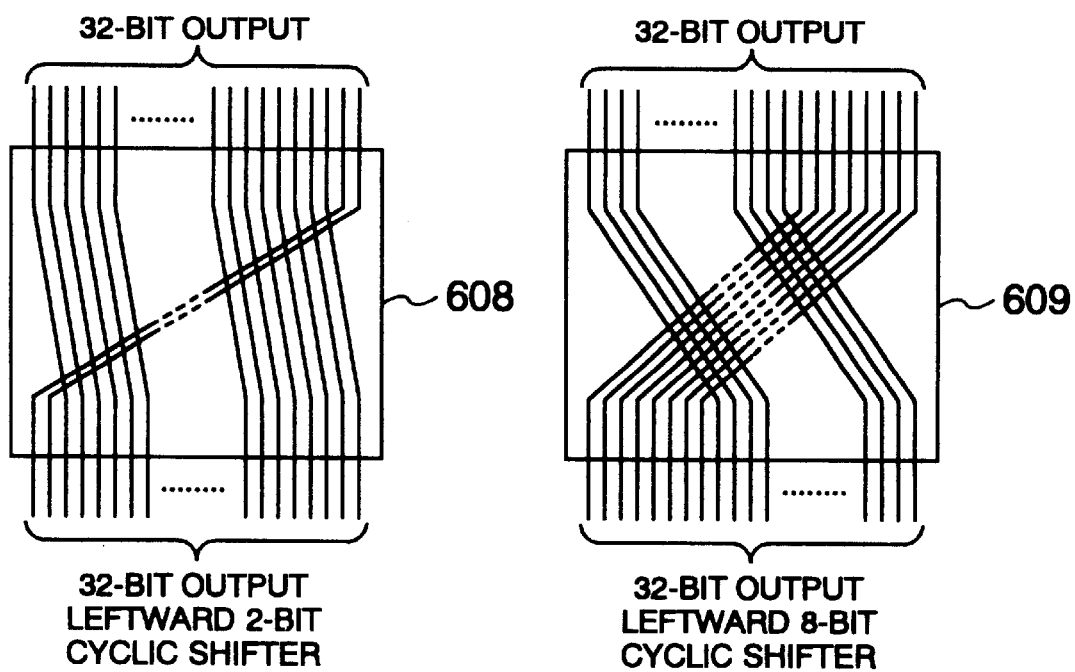
FIG. 6 is a wiring diagram showing schematically structures of a leftward 2-bit cyclic shifter and a leftward 8-bit cyclic shifter shown in FIG. 5.
FIG. 8 is a view for illustrating relations between initial values and internal statuses of a cyclic shift number qenerating circuit shown in FIG. 7.

FIG. 6 is a view showing schematically structures of the leftward 2-bit cyclic shifter 608 and the leftward 8-bit cyclic shifter 609 both of which can be realized by resorting to simple wired logic.

Figure 7:
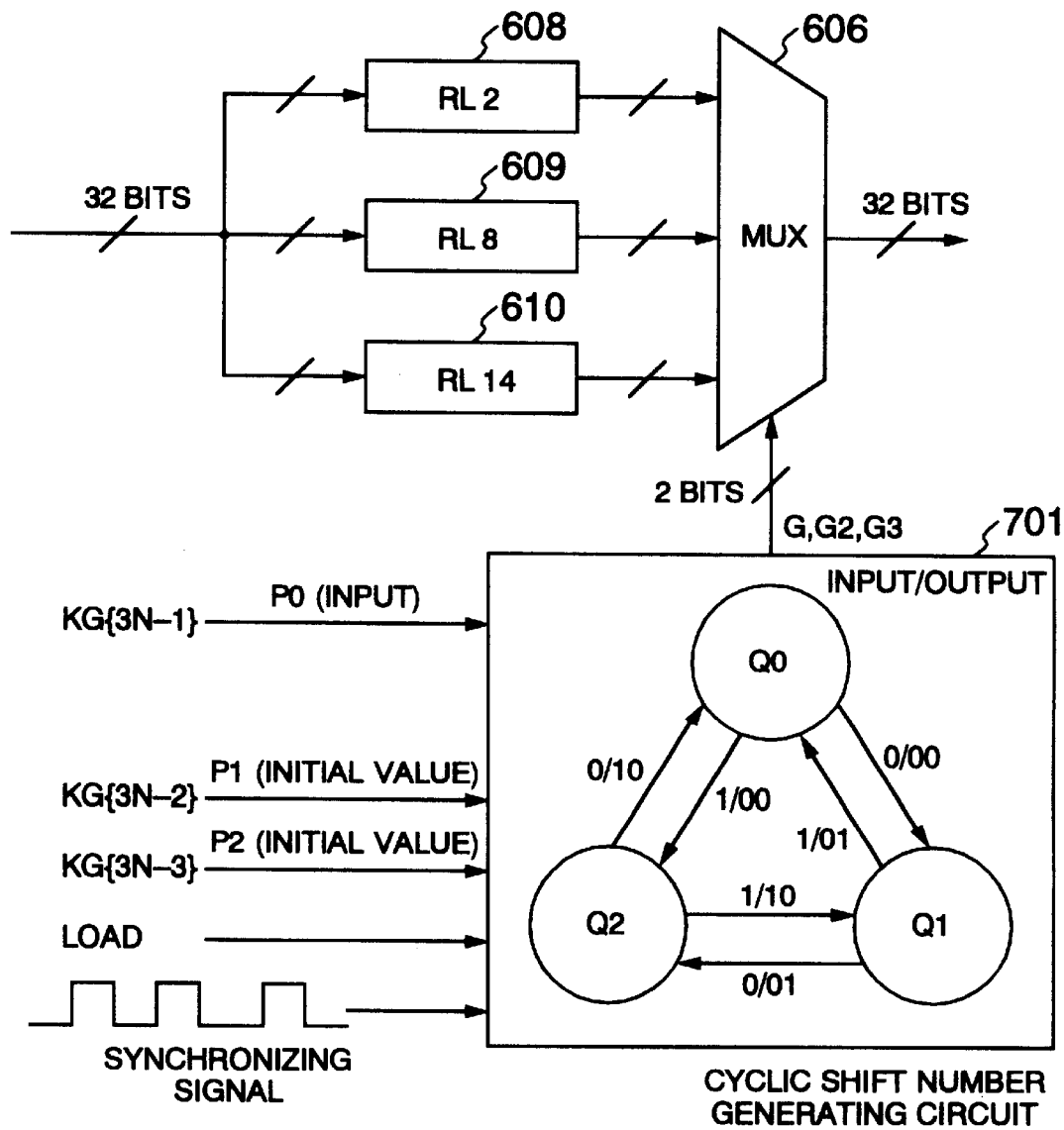
FIG. 7 is a view for illustrating control for a multiplexer which is designed for switching the cyclic shifters shown in FIG. 5.

FIG. 7 is a view for illustrating the control for the three-input multiplexer 606 which is designed for switching the cyclic shifter. Referring to the figure, the three-input multiplexer 606 receives as the input data thereto the 32-bit outputs from the leftward 2-bit cyclic shifter 608, the leftward 8-bit cyclic shifter 609 and the leftward 14-bit cyclic shifter 610, respectively. Further, the 2-bit control signals G1, G2 and G3 are inputted sequentially to the three-input multiplexer 606. In response to each of the control signals G1, G2 and G3, the three-input multiplexer 606 selects one input data from the three input data mentioned above to thereby output the selected data as the output value of 32 bits. At this juncture, it is to be mentioned that the relations between the output values of the three-input multiplexer 606 and the control inputs G1, G2 and G3, respectively, are such as defined in FIG. 4. The control inputs G1, G2 and G3 for the three-input multiplexer 606 are arithmetically determined by a cyclic shift number generating circuit 701 shown in FIG. 7. Parenthetically, the cyclic shift number generating circuit 701 corresponds to the cyclic shift number generating unit shown in FIG. 2.

The cyclic shift number generating circuit 701 is implemented in the form of a sequencer circuit which can assume three internal statuses Q0, Q1 and Q2. When the input P0 is "0", the internal statuses (Q0, Q1 and Q2) of the sequencer circuit constituting the cyclic shift number generating circuit 701 make state transitions in response to synchronizing signals as follows:

$Q0 \rightarrow Q1$ $Q1 \rightarrow Q2$ $Q2 \rightarrow Q0$

On the other hand, when the input P0 is "1", the undermentioned status transitions take place.

$Q0 \rightarrow Q2$ $Q1 \rightarrow Q0$ $Q2 \rightarrow Q1$

Thus, the sequencer circuit can be represented by a ternary increment/decrement counter. The output values of the sequencer circuit are illustrated in a status transition diagram of the cyclic shift number generating circuit 701 shown in FIG. 7.

The 3-bit data derived from the work key KG are employed as the input P0 as well as initial values P1 and P2, where P0, P1 and P2 are given as follows:

$P1 = KG\{3N-2\}$ $P2 = KG\{3N-3\}$

Figure 9:
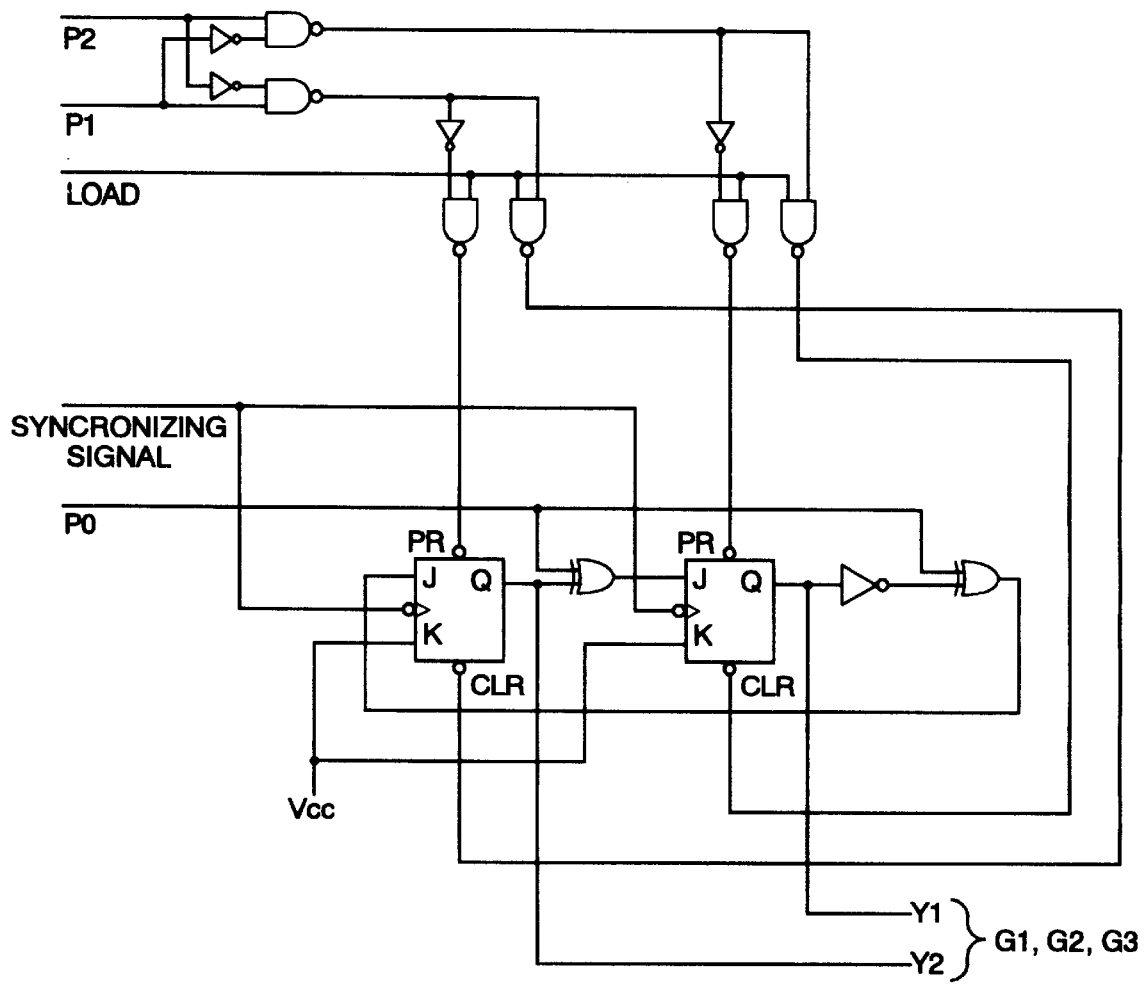
FIG. 9 is a diagram for illustrating in detail a circuit configuration of the cyclic shift number generating circuit shown in FIG. 7.

FIG. 8 is a view for illustrating relations between the initial values P1 and P2 and the internal statuses. To say in another way, the initial values of the internal statuses are determined as shown in FIG. 8 when a signal LOAD is "high". Incidentally, the cyclic shift number generating circuit 205 can be implemented in a simple circuit configuration. FIG. 9 is a circuit diagram of the cyclic shift number generating circuit. As is obvious for those skilled in the art, the circuit configuration shown in FIG. 9 is that of a ternary counter.

As will now be understood, according to the teachings of the present invention incarnated in the arrangement shown in FIG. 3, the encrypting conversion is carried out by combining the transposition processing realized by 2-bit, 8-bit and 14-bit leftward cyclic shift with the substitution processing, wherein the bit number for the cyclic shift at each stage is determined as shown in FIG. 4 on the basis of the values of the control signals G1, G2 and G3 which in turn are determined by the algorithm key KG, as can be seen in FIG. 2. Since the control signals G1, G2 and G3 at each stage assume mutually different values without exception, there can be conceived 6 (=3!) different orders or sequences for the cyclic shift operation. In the system according to the instant embodiment of the invention, it is assumed that ten encrypting conversion stages are provided. Consequently, the order or sequence for the cyclic shift operation is selected definitely from $6^{10}$ (tenth power of six) types or varieties. Thus, it is safe to say that the encrypting conversion can be realized with very high randomness owing to the teachings of the invention.

Next, in conjunction with the encrypting conversion illustrated in FIG. 3, the effect of the cyclic shift as exerted to the data diffusion will be examined. To this end, FIGS. 10 and 11 illustrate the encrypting conversion processes in the encrypting conversion system according to the instant embodiment of the invention on the conditions that $KA = KB = 0$ where KA and KB represent the work keys, respectively, $L[1] = R[1] = 0$ where L[1] represents the more significant 32-bit data with R[1] representing the least significant 32-bit data, and that the sequences of the cyclic shifts are as follows:

Case #1 (FIG. 10): $2 \rightarrow 8 \rightarrow 14$: at the first stage $2 \rightarrow 14 \rightarrow 8$: at the second stage $8 \rightarrow 2 \rightarrow 14$: at the third stage, and -continued Case #2 (FIG. 11): 8 → 14 → 2: at the first stage 14 → 2 → 8: at the second stage 14 → 8 → 2: at the third stage The first bit "1" produced through the first-stage encrypting conversions 4001 (FIG. 10) and 5001 (FIG. 11) and given by $$X2=(X1<<<S)+X1+1$$

exerts influence to the median significant bit through the cyclic shift till the second-stage encrypting conversions 4002 (FIG. 10) and 5002 (FIG. 11), and through the third-stage encrypting conversions 4003 (FIG. 10) and 5003 (FIG. 11), all the bits are diffused. Further, comparison of the case #1 with the case #2 shows that conversion to utterly different values is realized, which means that changes of the sequence of the cyclic shifts is effective for the data diffusion.

Now, description will turn to a decrypting conversion processing according to the instant embodiment of the invention.

Figure 12:
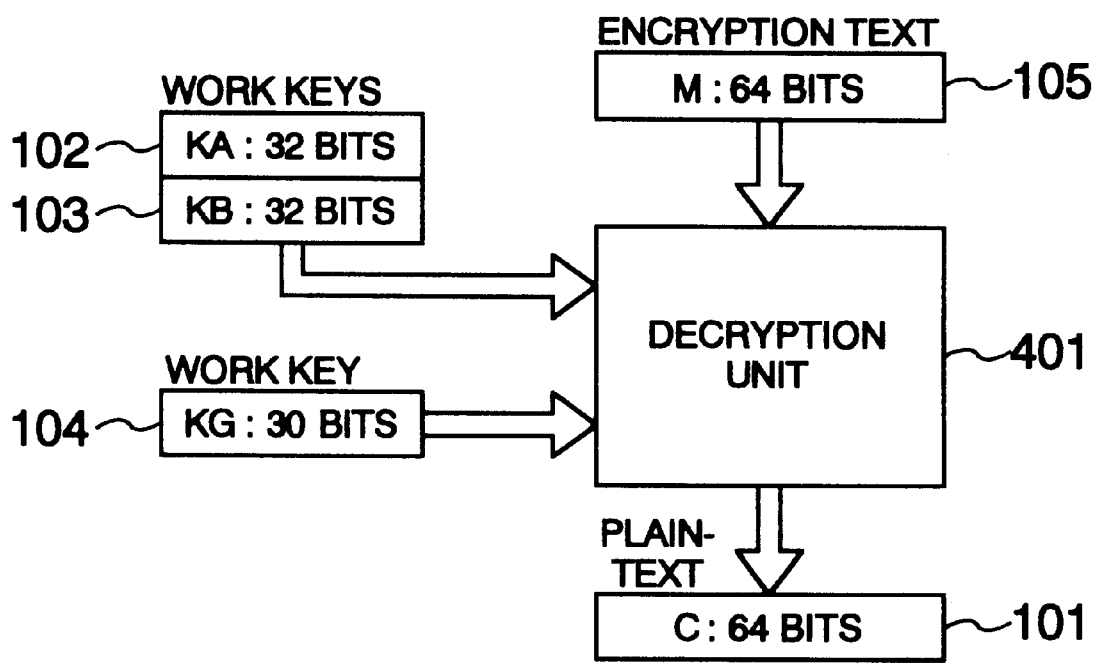
FIG. 12 is a block diagram showing schematically a general arrangement of a decrypting conversion apparatus according to an embodiment of the invention.

FIG. 12 is a block diagram showing schematically a general arrangement of a decrypting conversion apparatus according to the instant embodiment of the invention. Referring to the figure, inputted to a decryption unit 401 are an encrypted text (M) 105 of 64bits, a work key (KA) 102 of 32 bits, a work key (KB) 103 of 32 bits and a work key (KG) 104 of 30 bits. After the decrypting conversion performed for the encrypted text (M) 105, a plain-text (C) 101 of 64 bits is outputted from the decryption unit 401. Needless to say, the decryption unit 401 has a function of converting the inputted encrypted text to an original plain-text. As described previously, the encrypting conversion processing at the N-the stage is stated as follows:

$$L[N+1]=R[N]+F(L[N], K, G)R[N+1]=L[N]$$

Accordingly, the decrypting conversion processing at the N-th stage can be given by the following expressions:

$$R[N]=L[N+1]-F(R[N+1], K, G)L[N]=R[N+1]$$

At this juncture, it should be mentioned that throughout the specification, the arithmetic expression "A−B" in general represents a remainder resulting from division of the result of subtraction between "A" and "B" by the thirty-second power of "2". Hereinafter, "A−B" will also be referred to simply as the subtraction. Thus, it will be understood that the decryption unit 401 can be realized by replacing the addition circuit 306 shown in FIG. 3 by a subtraction circuit. Further, at a given N-th decryption processing stage (where N represents a natural number), the inputs "R[N+1]" and "L[N+1]" are processed to be outputted as "R[N]" and "L[N]". The decryption can be realized by repeating the above processing ten times at the respective decrypting stages.

Embodiment 2

A second embodiment of the present invention will be described.

In the case of the encrypting conversion system according to the first embodiment of the invention described hereinbefore by reference to FIG. 3, it has been assumed that the cyclic shift encrypting conversion unit is so designed as to select three types of bit strings, i.e., leftward-shift-destined 2 bits, leftward-shift-destined 8 bits or leftward-shift-destined 14bits with the work key KG (i.e., the data for determining the shift number selecting sequence). It is however noted that substantially same effects can be obtained by changing the number of bits to be shifted leftward or rightward as well as the number of different types of cyclic shift processions. Besides, the work key KG may be set previously and undergo no change or alternatively the work key KG may be altered on a period-by-period basis. By way of example, the cyclic shift conversion unit may be so designed as to select leftward-shift-destined 2 bits, leftward-shift-destined 9 bits and leftward-shift-destined 19 bits. In this conjunction, such change of the bit strings to be shifted leftward or rightward can easily be realized simply by changing correspondingly the wired logic shown in FIG. 7 without involving any appreciable change in the circuit scale.

Figure 13:
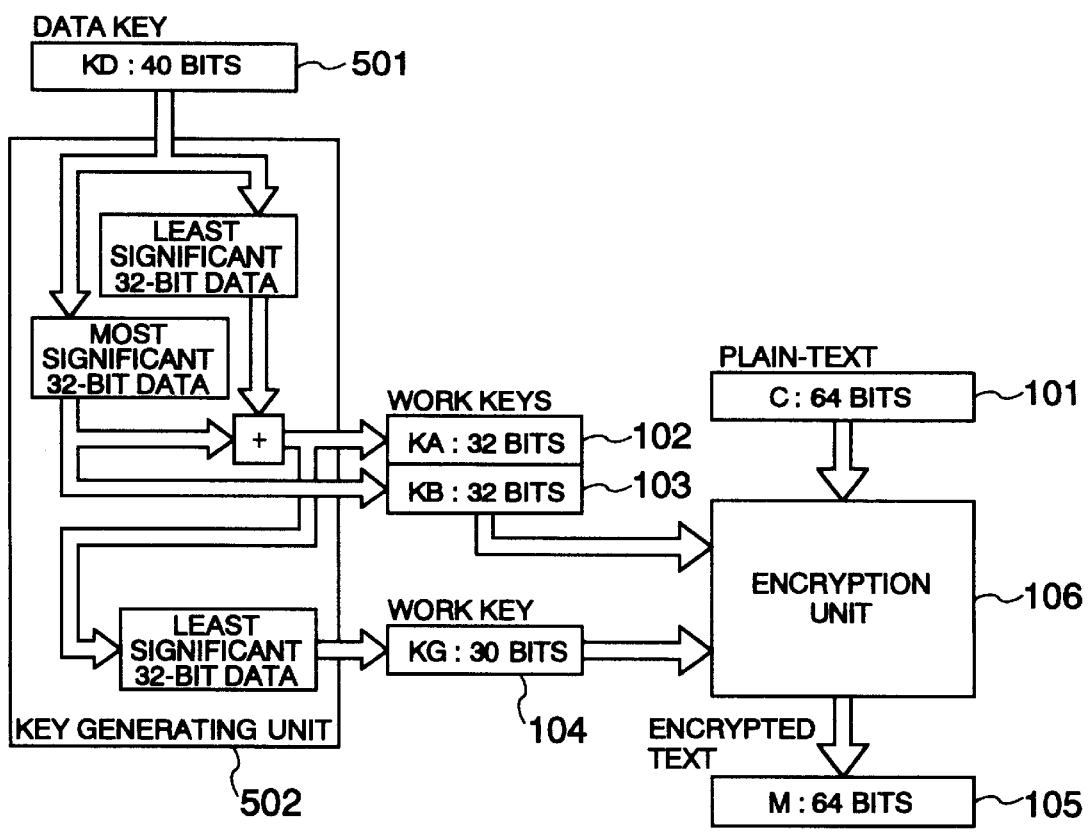
FIG. 13 is a block diagram showing a circuit arrangement for generating a data key from a plurality of work keys used in carrying out the invention.

Further, in conjunction with the encrypting conversion apparatus shown in FIG. 3, it has been assumed that the work key KA, the work key KB and the work key KG are handled as the independent keys. However, such scheme can equally be adopted in which these keys are generated from a single data key KD. An exemplary circuit configuration to this end is shown in FIG. 13. Referring to the figure, a key generating unit 502 is designed to generate the work key KA, the work key KB and the work key KG from a data key (KD) 501 in such manners as defined below:

1) Work key KA is generated by the addition of the more significant 32 bits and least significant 32 bits of the data key KD.
2) Work key KB is generated by using the more significant 32 bits of the data key KD.
3) Work key KG is generated by using the least significant 30 bits of the work key KA.

Embodiment 3

Next, referring to FIG. 14, description will be made of a third embodiment of the invention which is directed to realization of the teachings of the invention by resorting to software technique.

In the instant embodiment of the invention, nine data mentioned below are used.

L : data to undergo encrypting conversion (32 bits)
R : data to undergo encrypting conversion (32 bits)
KA : data of work key #1 (32 bits)
KB : data of work key #1 (32 bits)
KG : data of work key #2 (32 bits)
Q : internal status value of cyclic shift generating module (8 bits)
N : counter value (8 bits)
X : data for the work (32 bits)
S : data for the work (32 bits)

Now, processing contents illustrated in FIG. 14 will be described in order.

Figure 14:
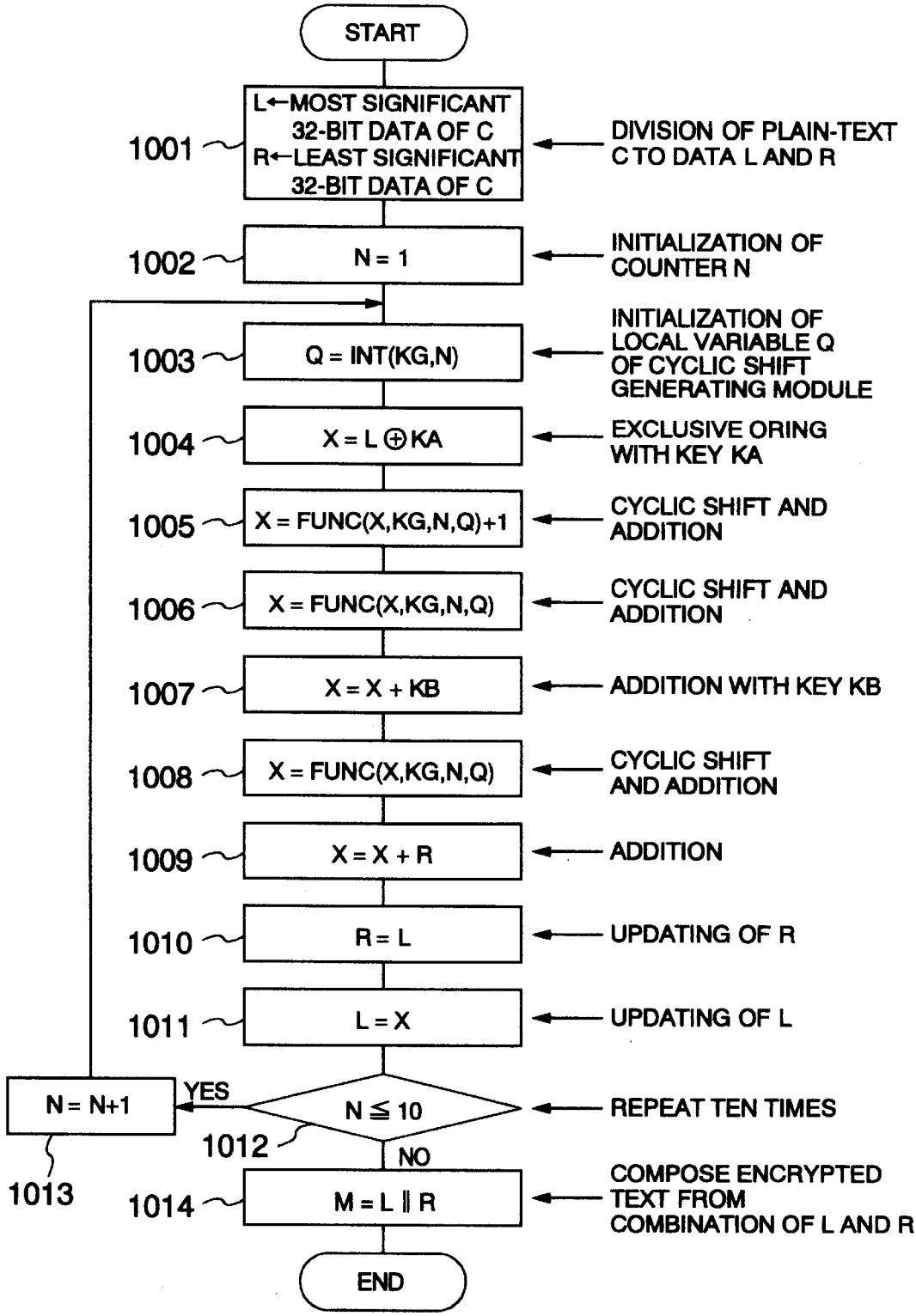
FIG. 14 is a flow chart for illustrating processing when the present invention is carried out softwarewise.
Figure 15:
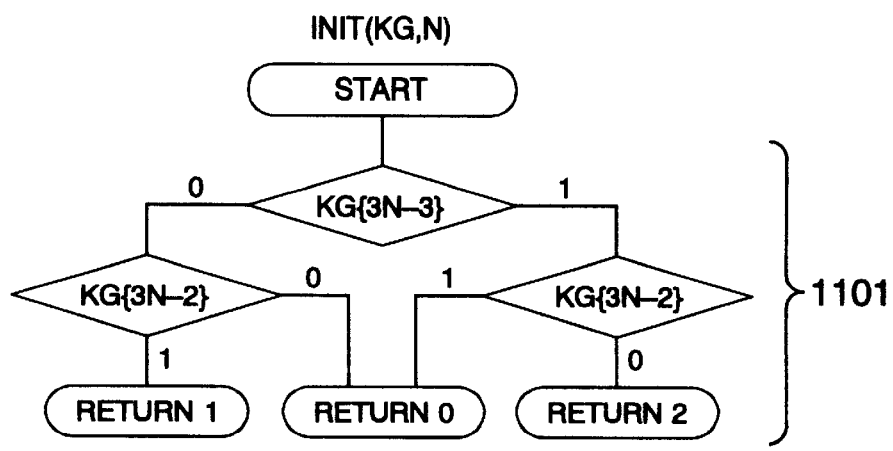
FIG. 15 is a flow chart for illustrating an local variable initialize function incorporated in a cyclic shift generating module used in the conversion process shown in FIG. 14.

(1) In a processing step 1001 shown in FIG. 14, a plain-text C of 64bits is divided into more significant 32-bit data which are substituted for (or set as) the encrypting conversion undergoing data L and the encrypting conversion undergoing data R, respectively.
(2) In a processing step 1002 shown in FIG. 14, a counter value N is set to "1".
(3) In a processing step 1003 shown in FIG. 14, a returned value of an local variable initializing function INIT(KG, N) incorporated in the cyclic shift generating module is substituted for the internal status value Q of the cyclic shift generating module. In the case of the instant embodiment of the invention, the returned value of the local variable initializing function INIT(KG, N) incorporated in the cyclic shift is determined from the values of the work key (#2) KG{3N−3} and the work key (#2) KG{3N−2} in a processing step 1101 shown in FIG. 15.

(4) Exclusive-OR of the encrypting conversion undergoing data L and the work key (#1) data KA is substituted for (or set as) the work-oriented data X in a processing step 1004 shown in FIG. 14.

(5) In a processing step 1005 shown in FIG. 14, the returned value S=FUNC(X, KG, N, Q) from the cyclic shift and add function is added with "1" and is substituted for (or set as) the work-oriented data X.

(6) In a processing step 1006 shown in FIG. 14, the returned value S=FUNC(X, KG, N, Q) from the cyclic shift and add function is substituted for the work-oriented data X.

(7) The work-oriented data X is added with the work key (#1) KB data and substituted for the work-oriented data X in a processing step 1007 shown in FIG. 14.

(8) In a processing step 1008 shown in FIG. 14, the returned value S=FUNC(X, KG, N, Q) from the cyclic shift and add function is substituted for the work-oriented data X.

(9) The work-oriented data X is added with the encrypting conversion undergoing data R and substituted for (or set as) the work-oriented data X in a processing step 1009 shown in FIG. 14.

(10) The encrypting conversion undergoing data L is substituted for the encrypting conversion undergoing data R in a processing step 1010 shown in FIG. 14.

(11) The work-oriented data X is substituted for the encrypting conversion undergoing data L in a processing step 1011 shown in FIG. 14.

(12) In a processing step 1012 shown in FIG. 14, it is decided whether or not the counter value N is smaller than "10" inclusive.

(13) When it is decided in the decision step 1012 that the counter value N is not greater than "10", then the value of the counter value N is incremented by "1" (one) in a processing step 1013 shown in FIG. 14. Subsequently, the processing step 1003 is resumed.

(14) On the other hand, if the counter value N is greater than "10" in the step 1012, then the encrypting conversion undergoing data L is combined with the encrypting conversion undergoing data R, the result of which is outputted as an encrypted text M.

Figure 16:
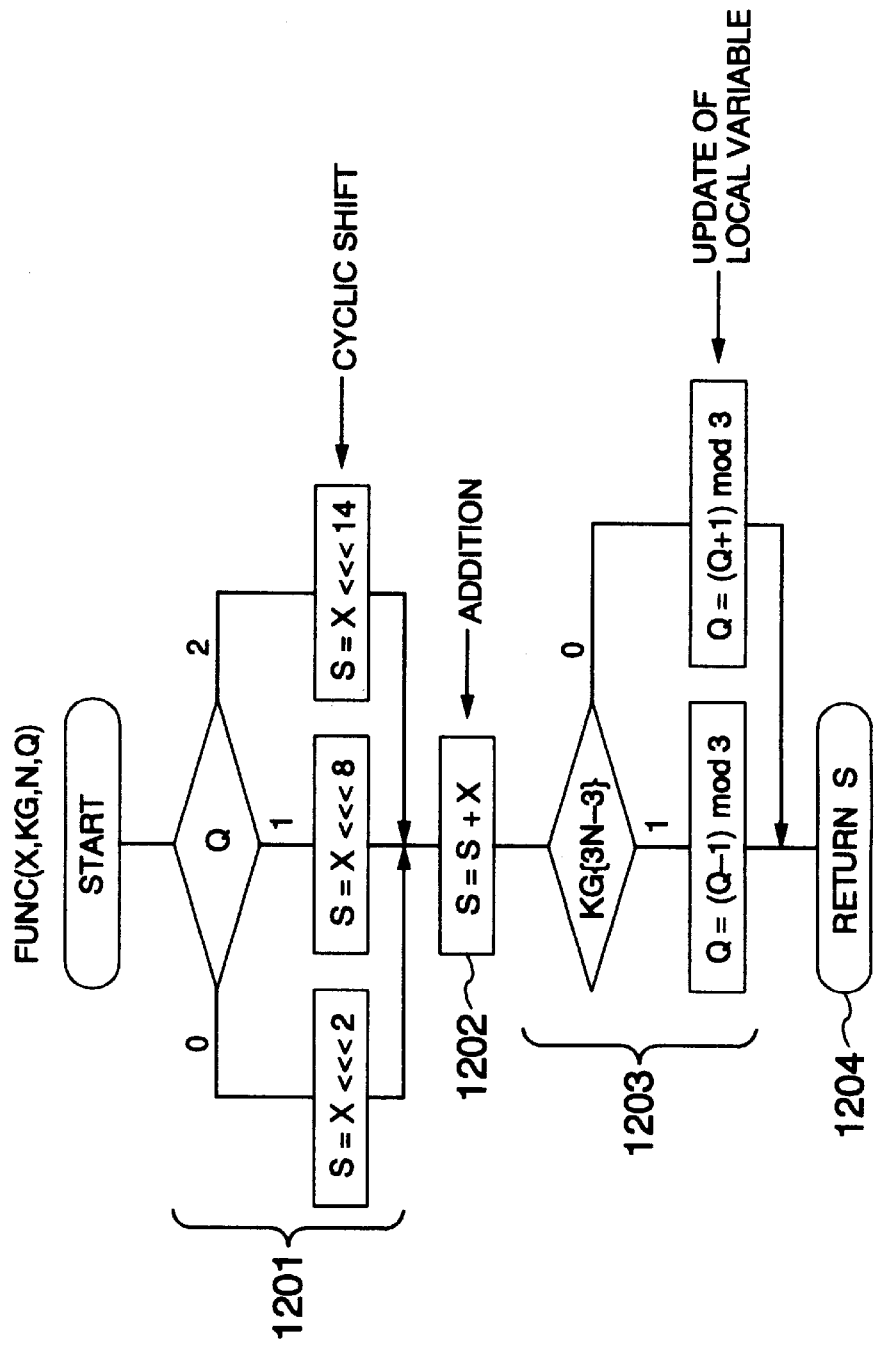
FIG. 16 is a flow chart for illustrating cyclic shift and add function used in the conversion process shown in FIG. 14.

The cyclic shift and the add function FUNC(X, KG, N, Q) are realized through the processions illustrated in a flow chart of FIG. 16. The contents of the processions shown in this figure will be described below.

(1) On the basis of the internal status value Q, the leftward cyclic shift by 2 bits, by 8 bits or by 14bits is performed for the work-oriented data X, the result of which is saved as the work-oriented data S in a processing step 1201 shown in FIG. 16.

(2) Result of the addition of the work-oriented data S and the work-oriented data X is again saved as the work-oriented data S in a processing step 1202.

(3) In case the value of the work-key (#2) data KG{3N−1} is "0", the internal status value Q is updated to a value equal to a remainder resulting from division of the result of incrementation of the internal status value Q by "1", whereas when the value of the work key (#2) data KG{3N−1} is "1", the internal status value Q is updated to a value equal to a remainder resulting from division of the result of decrementation of the internal status value Q by "1" (processing step 1203 in FIG. 16).

(4) The value of the work-oriented data S is substituted for the returned value in a processing step 1204 shown in FIG. 16.

It is self-explanatory from the foregoing description that softwarewise decryption processings can be realized by replacing the addition processing 1009 shown in FIG. 14 by the subtraction processing. In the foregoing, the embodiment of the invention which is directed to the softwarewise realization of the encryption processing and the decryption processing has been described. As can readily be understood, intelligent encryption processing can be realized with simple software structure. Accordingly, the teachings of the invention incarnated in the instant embodiment can easily be applied to the home-use-destined electric/electronic equipment.

Embodiment 4

A fourth embodiment of the invention is directed to authentication of a counterpart. This embodiment will be described by referring to FIG. 17. It is assumed that an equipment (A) 1301 and an equipment (B) 1302 are interconnected through a network or an external bus 1303 and that the equipment (A) 1301 and the equipment (B) 1302 are home-use-destined electric/elec-tronic equipment, personal computers or the like. Besides, it is presumed that each of encryption apparatuses 1304 and 1307 and each of decryption apparatuses 1305 and 1306 are implemented in the form of the encryption apparatus and the decryption apparatus described hereinbefore by reference to FIGS. 1 and 12, respectively. Now, description will be made of the authentication of the counterpart equipment in the system shown in FIG. 17.

Figure 17:
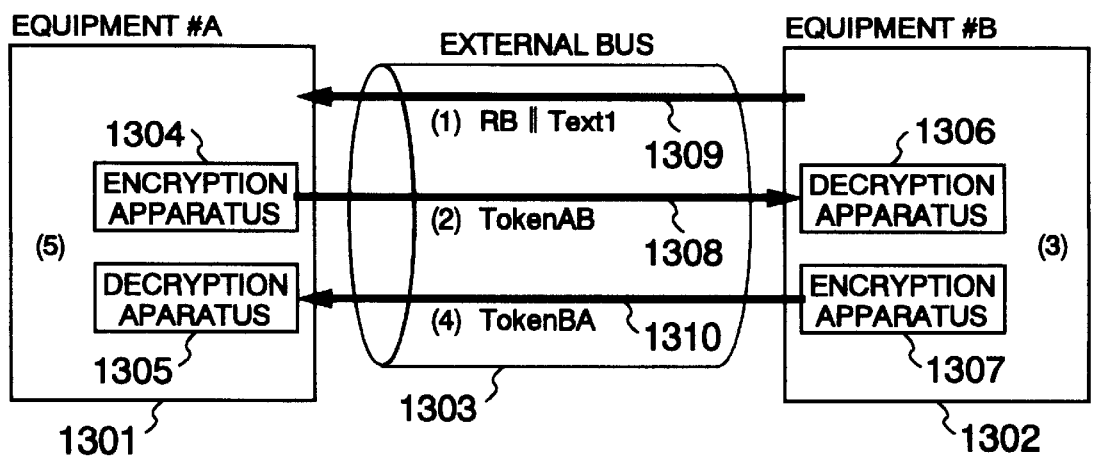
FIG. 17 is a schematic block diagram illustrating a counterpart authenticity verifying scheme according to another embodiment of the invention.

(1) Referring to FIG. 17, the equipment (B) 1302 generates a random number RB and transmits data RB∥Text 1 to the equipment A, as indicated by reference numeral 1309. At this juncture, it is to be noted that "Text 1" represents auxiliary information, and that the expression "X∥Y" in general represents combination of "X" and "Y".

(2) The equipment (A) 1301 generates data given by the undermentioned expression and sends it to the equipment (B) 1302 as indicated by an arrow 1308.

Token AB=Text 3∥eKAB (RA∥RB∥IB∥Text 2) In the above expression, "RA" represents a random number generated by the equipment (A) 1301, "IB" represents the identifier of the equipment (B) 1302, "Text 2" and "Text 3" represent auxiliary information, and "eKAB(X)" represents that "X" is encrypted with a shared secret key KAB common to both the equipment (A) 1301 and the equipment (B) 1302.

(3) Upon reception of the data "Token AB", the equipment (B) 1302 decrypts the enciphered text portion to thereby confirm that the identifier IB as well as the random number RB sent to the equipment A is correct.

(4) The equipment (B) 1302 generates data given by the undermentioned expression and sends it to the equipment (A) 1301 as indicated by an arrow 1310.

Token BA=Text 5∥eKAB (RB∥RA∥IA∥Text 4)

In the above expression, "Text 4" and "Text 5" represent auxiliary information.

(5) Upon reception of the data "Token BA", the equipment (A) 1301 decrypts the enciphered text portion to thereby confirm that both the random number RB received from the equipment (B) 1302 at the above-mentioned stage (1) and the random number RA sent to the quipment (B) 1302 at the above-mentioned stage (2) are contained in the data "Token BA".

As is apparent from the above description in he paragraphs (1) to (5), the encryption apparatus as well as the decryption apparatus can enjoy the advantageous feature that the authenticity of the counterparts can be mutually confirmed. At this juncture, it should be added that the auxiliary data or information Text 2 or Text 4 may be stored in the work key or data key. In that case, the data key or the work key can be shared by the equipment A and B with high security.

Embodiment 5

Next, description will be made of a system for circulating or distributing package contents such as DVD-video or the like according to fourth embodiment of the present invention. FIG. 18 is a block diagram showing a package contents distributing/circulating system according to the instant embodiment of the invention.

Figure 19:
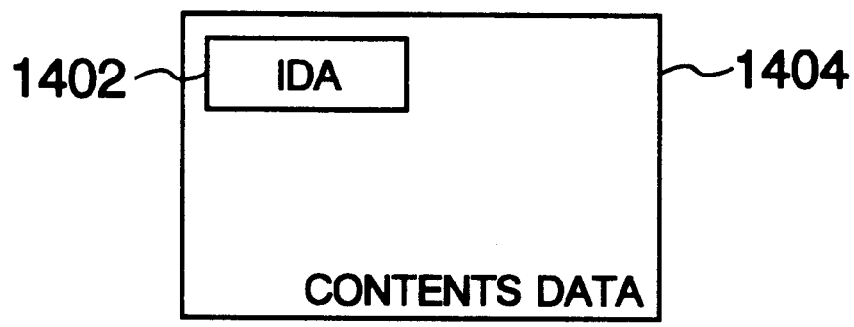
FIG. 19 is a schematic view for illustrating an example of contents data which contains electronic transparent information.

Referring to the figure, a contents provider 1401 registers copyright information at a copyright managing facility 1418 to obtain contents identification information (IDA) 1402. The contents identification information (IDA) 1402 is embedded into the contents data 1403 by resorting to an electronic transparentizing technique (or so-called digital watermarking technique) which allows the identification information or the like to be contained in digital data in a hidden state, whereby package contents 1404 is finished. FIG. 19 is a schematic view illustrating the contents data contained in the package contents 1404, wherein the contents identification information (IDA) 1402 is embedded as an electronic transparent information.

Figure 20:
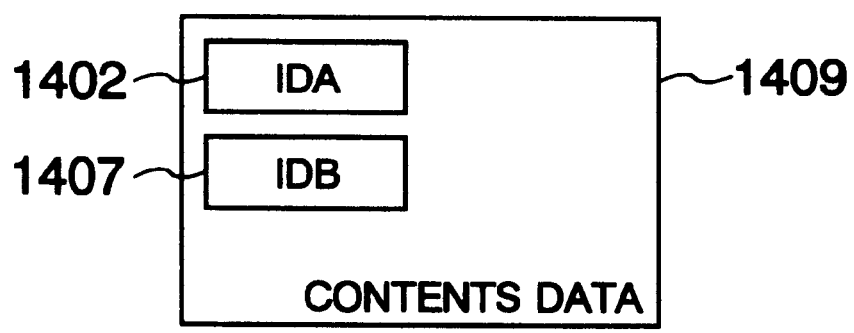
FIG. 20 is a view showing schematically and illustratively another example of the contents data which contains electronic transparent information.

When the contents data contained in the package contents 1404 is to be transferred from the home-use-destined electric/electronic equipment (B) 1405 to a personal computer (C) 1411, the user identification information (IDB) 1407 issued by the copyright managing facility 1418 is embedded in the contents data 1403 in the home-use-destined electric/electronic equipment (B) 1405, whereon the contents data 1403 having the electronic transparent information embedded is encrypted with key data (K) 1408 by the encryption apparatus 1406 incarnating the teachings of the invention, to be output-ted onto the external bus as the encrypted text data. FIG. 20 is a view showing schematically and illustratively the contents data transmitted along a path 1409, which contains the contents identification information (IDA) 1402 and the user identification information (IDB) 1407 as the electronic transparent information.

On the other hand, in the personal computer (C) 1411 which receives the contents data from the home-use-destined electric/electronic equipment (B) 1405, the encrypted data is decrypted by a decryption apparatus 1412 according to the invention by using key data (K) 1415. In the processing procedure described above, IC (integrated circuit) cards 1410 and 1417 may be employed for managing the user information and the key data.

Figure 21:
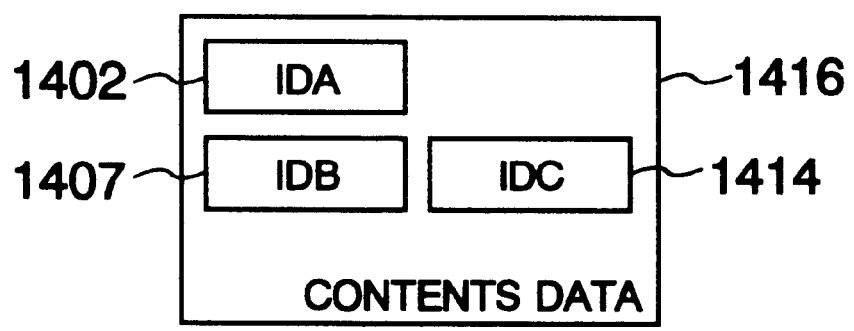
FIG. 21 is a view showing schematically and illustratively yet another example of the contents data which contains electronic transparent information.

When the contents data is to be transferred from the personal computer (C) 1411 to the network, the user identification information (IDC) 1414 issued by the copyright managing facility 1418 is embedded in the contents data as the electronic transparent information in the personal computer (C) 1411, whereon the contents data incorporating the electronic transparent information is encrypted with key data (K) 1415 by the encryption apparatus 1413 incarnating the teachings of the invention. FIG. 21 is a view showing schematically and illustratively the contents data transmitted along a path 1416, which contains the contents identification information (IDA) 1402, the user identification information (IDB) 1407 and the user identification information (IDC) 1414 as the electronic transparent information. In the processing procedure described above, IC card 1417 may be employed for managing the user information and the key data.

The copyright managing facility 1418 serves to monitor or supervise the data transferred via a network. Upon detection of the data not decrypted, the contents identification information IDA contained in the data is matched with the information contained in a copyright information managing database 1420. When it is decided as the result of the matching that the data of concern is unauthorized copy, the copyright managing facility 1418 traces the latter back to the origin by making use of the user identification information and can impose penalty.

Embodiment 6

Figure 22:
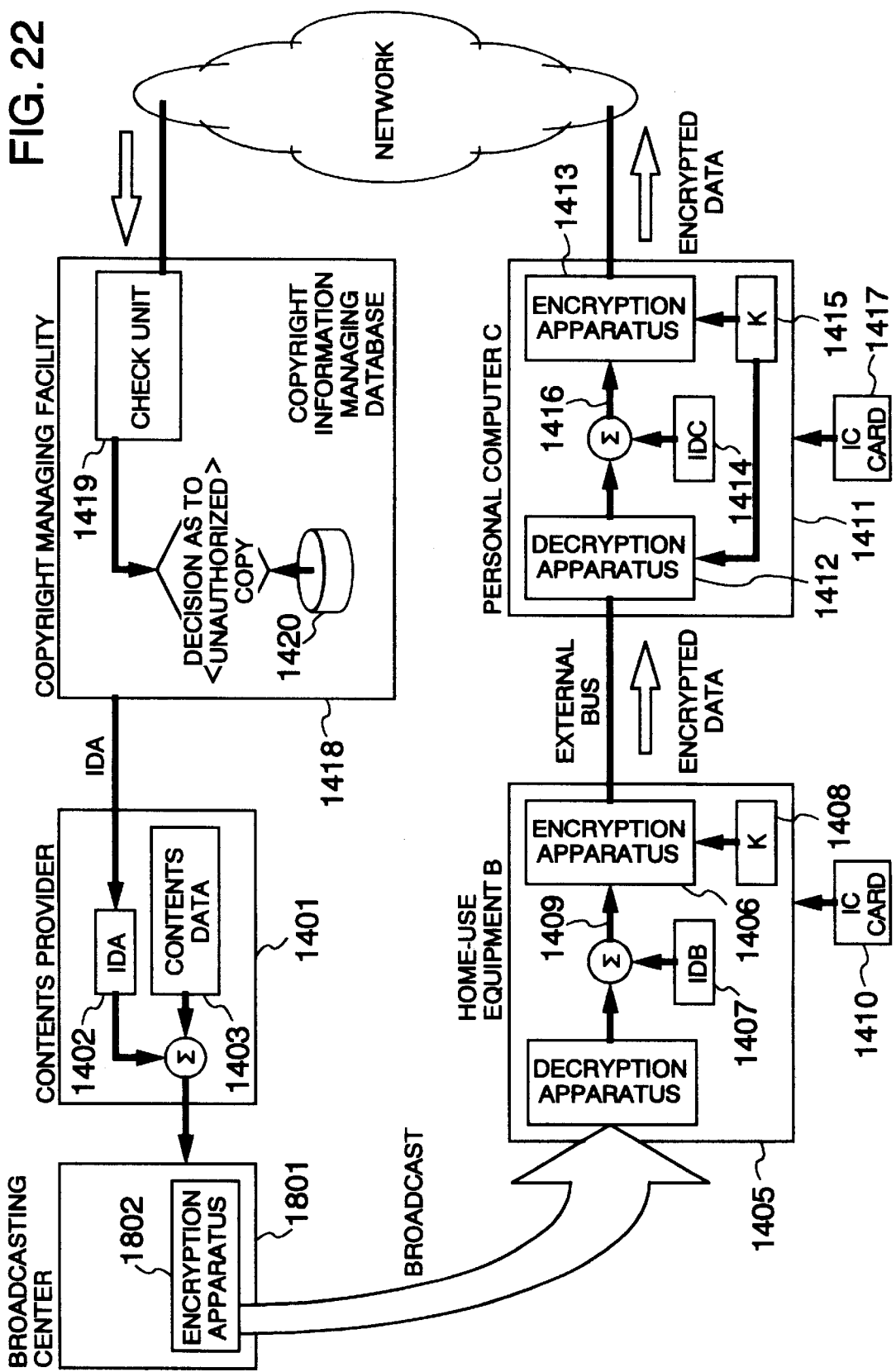
FIG. 22 is a view showing a distributing/circulating system for contents according to still another embodiment of the present invention.
Figure 23:
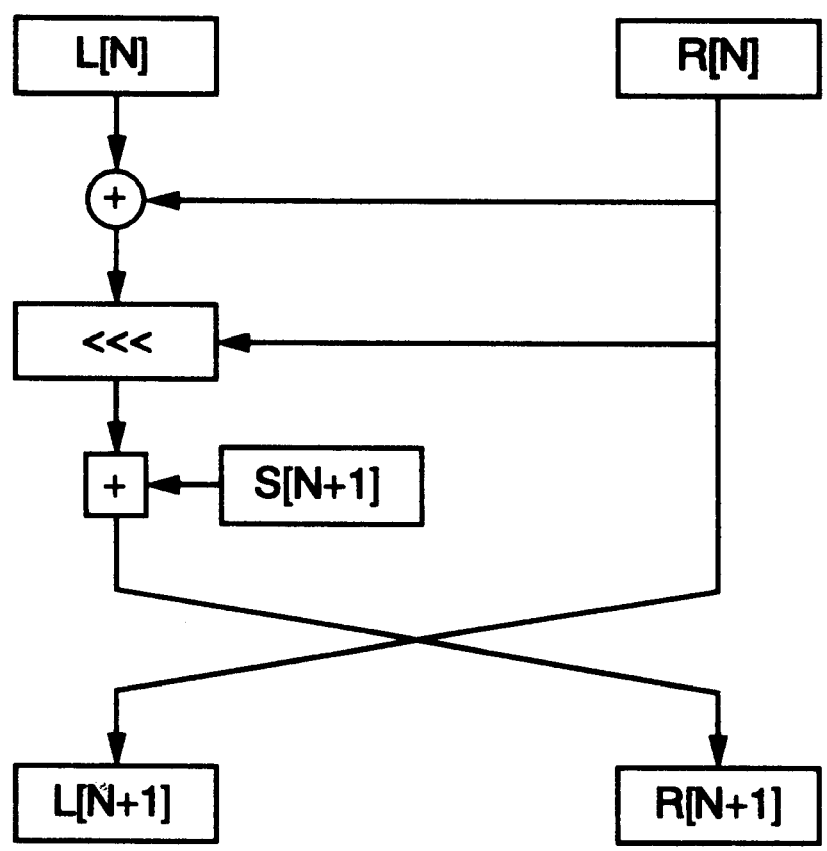
FIG. 23 is a view for illustrating RC5 encryption algorithm known heretofore.

FIG. 22 shows a distributing/circulating system for the digital contents via a broadcast system such as a digital satellite broadcasting or the like according to a sixth embodiment of the present invention. Referring to the figure, a contents provider 1401 registers copyright information at a copyright managing facility 1418 and obtains contents identification information (IDA) 1402. The contents data having the contents identification information IDA embedded as electronic transparent information or watermark is sent to a broadcasting center 1801 and encrypted by means of an existing encryption apparatus 1802 to be subsequently broadcast toward home-use-destined electric/electronic equipment. In the home-use-destined electric/electronic equipment, the broadcast data as received is decrypted by means of an existing decryption apparatus 1803. In that case, the home-use-destined electric/electronic equipment is equipped with an encryption apparatus 1406 incarnating the teachings of the present invention. Thereafter, the contents data is distributed or circulated in a manner similar to the case illustrated in FIG. 18.

As is apparent from the above, it is possible to structurize a distribution/circulation system for digital contents by combining the encrypting conversion system according to the invention with the existing encrypting conversion system such as the digital satellite broadcasting system. In other words, the present invention can find application over a wide range of media such as package media, broadcasting media, communication media, etc.

Finally, it should be added that the present invention provides encryption systems or schemes which ensure highly enhanced randomness.

What is claimed is:

1. An encrypting conversion apparatus in which at least one key and plain text data are inputted, the inputted plain text is divided into a first data and a second data, said first data and said second data are set as a first initial data L[1] and a second initial data R[1], an encrypting conversion processing is repeated at least twice using the same function to receive data L[N] and data R[N] and output data L[N+1] and data R[N+1], respectively, wherein N is a natural number, and a combination of the two output data from a final stage of the encrypting conversion processing is provided as an encrypted text, comprising:

cyclic shift processing means for performing a cyclic shift processing based on a shift number determined by data for determining a shift number selecting sequence, said shift number being independent from the plain text data; and said cyclic shift processing means including at least two different fixed cyclic shift processing means each for performing cyclic shift by a fixed number of bits leftward or alternatively rightward, cyclic shift processing selecting means for selecting said fixed cyclic shift processing means, and cyclic shift processing sequence determining means for determining a selecting sequence for said cyclic shift processing selecting means on the basis of said data for determining a shift number selecting sequence;

encrypting conversion processing means for performing at least once for said data L[N] a conversion processing by using said key and a cyclic shift processing using said cyclic shift processing means, respectively, to thereby generate data X, and arithmetically operating said data R[N] and said data X to obtain a value for said data L[N+1] and set said data L[N] for said data R[N+1].

2. An encrypting conversion apparatus according to claim 1, said cyclic shift processing sequence determining means being so arranged as to select at least two of said fixed cyclic shift processing means in accordance with the sequence determined by said cyclic shift processing sequence determining means;

said cyclic shift processing sequence determining means being so arranged as to determine the cyclic shift processing sequence which differs from one to another stage of said encrypting conversion processing means in response to input values of bit strings of the data, respectively, for thereby determining said shift number, said input values of said bit strings differing from one to another stage of said encrypting conversion processing means; and said encrypting conversion processing means being so arranged as to perform block-based encrypting conversions which differ from one to another stage of said encrypting conversion processing means.

3. An encrypting conversion apparatus according to claim 1, wherein said fixed cyclic shift processing means is constituted by a wired logic circuit.

4. An encrypting conversion apparatus according to claim 1, wherein said cyclic shift processing selecting means is constituted by a multiplexer.

5. An encrypting conversion apparatus according to claim 1, wherein said cyclic shift processing sequence determining means is implemented by a cyclic shift processing sequence generating circuit which makes internal status transition in response to a synchronizing signal by using said cyclic shift determining data as initial values of internal statuses and input signals for thereby outputting control input signals for said cyclic shift processing selecting means.

6. An encrypting conversion apparatus according to claim 1, wherein said fixed cyclic shift processing means, said cyclic shift processing means and said cyclic shift processing sequence determining means are each implemented in software.

7. A decrypting conversion apparatus in which at least one key and encrypted text data are inputted, the inputted encrypted text is divided into a first data and a second data, said first data and said second data are set as a first initial data L[1] and a second initial data R[1], a decrypting conversion processing is repeated at least twice using the same function to receive data L[N] and data R[N] and output data L[N+1] and data R[N+1], respectively, wherein N is a natural number, and a combination of the two output data from a final stage of the decrypting conversion processing is provided as plain text data, comprising:

cyclic shift processing means for performing a cyclic shift processing based on a shift number determined by data for determining a shift number selecting sequence, said shift number being independent from the plain text data; and said cyclic shift processing means including at least two different fixed cyclic shift processing means each for performing cyclic shift by a fixed number of bits leftward or alternatively rightward, cyclic shift processing selecting means for selecting said fixed cyclic shift processing means, and cyclic shift processing sequence determining means for determining a selecting sequence for said cyclic shift processing selecting means on the basis of said data for determining a shift number selecting sequence;

decrypting conversion processing means for performing at least once for said data L[N] a conversion processing by using said key and a cyclic shift processing using said cyclic shift processing means, respectively, to thereby generate data X, and arithmetically operating said data R[N] and said data X to obtain a value for said data L[N+1] and set said data L[N] for said data R[N+1].

8. A decrypting conversion apparatus according to claim 7, said cyclic shift processing sequence determining means being so arranged as to select at least two of said fixed cyclic shift processing means in accordance with the sequence determined by said cyclic shift sequence determining means;

said cyclic shift processing sequence determining means being so arranged as to determine the cyclic shift processing sequence which differs from one to another stage of said decrypting conversion processing means in response to input values of bit strings of the data, respectively, for thereby determining said shift number, said input values of said bit strings differing from one to another stage of said decrypting conversion processing means; and said decrypting conversion processing means being arranged so as to perform block-based decrypting conversion processings which differ from one to another stage of said decrypting conversion processing means.

9. A decrypting conversion apparatus according to claim 7, wherein said cyclic shift processing sequence determining means is implemented by a cyclic shift processing sequence generating circuit which makes internal status transit in response to a synchronizing signal by using said cyclic shift determining data as initial values of internal statuses and input signals for thereby outputting a control input signal for said cyclic shift processing selecting means.

10. An encrypting conversion method of generating encrypted text data, comprising in combination the steps of:

inputting at least one key and plain text data, dividing the inputted plain text into a first data and a second data;

setting said first data and said second data as a first initial data L[1] and a second initial data R[1];

repeating at least twice an encrypting conversion processing using the same function to receive data L[N] and data R[N] and output data L[N+1] and data R[N+1], respectively, where N is a natural number;

providing a combination of the two output data from a final stage of the encrypting conversion processing is provided as an encrypted text;

performing a cyclic shift processing based on a shift number by data for determining a shift number, said shift number being independent from the plain text data;

performing at least once for said data L[N], a conversion processing by using said key and a cyclic shift processing using said cyclic shift processing performing step, respectively, to thereby generate data X;

arithmetically operating said data R[N] and said data X to obtain a value for said data L[N+1] and set said data L[N] for said data R[N+1]; and wherein the data for determining the shift number is made to differ between at least two encrypting conversion processings.

11. A decrypting conversion method of generating plain text data, comprising in combination the steps of:

inputting at least one key and encrypted text data, dividing the inputted encrypted text into a first data and a second data;

setting said first data and said second data as a first initial data L[1] and a second initial data R[1];

repeating at least twice a decrypting conversion processing using the same function to receive data L[N] and data R[N] and output data L[N+1] and data R[N+1], respectively, where N is a natural number;

providing a combination of the two output data from a final stage of the decrypting conversion processing as plain text;

performing a cyclic shift processing based on a shift number by data for determining a shift number, said shift number being independent from the plain text data;

performing at least once for said data L [N], a conversion processing by using said key and a cyclic shift processing using said cyclic shift processing performing step, respectively, to thereby generate data X; and arithmetically operating said data R[N] and said data X to obtain a value for said data L[N+1] and set said data L[N] for said data R[N+1];

wherein the data for determining the shift number is made to differ between at least two decrypting conversion processings.

12. A computer program for generating encrypted text data in which at least one key and plain text data are inputted, the inputted plain text is divided into a first data and a second data, said first data and said second data are set as a first initial data L[1] and a second initial data R[1], an encrypting conversion processing is repeated at least twice using the same function to receive data L[N] and data R[N] and output data L[N+1] and data R[N+1], respectively, wherein N is a natural number, and a combination of the two output data from a final stage of the encrypting conversion processing is provided as an encrypted text, the computer program stored on a computer-readable medium and comprising:

instructions for performing a cyclic shift processing for performing a cyclic shift processing based on a shift number determined by data for determining a shift number, said shift number being independent from the plain text data;

instructions for performing at least once for said date L[N] an encrypting conversion processing by using said key and a cyclic shift processing using said cyclic shift processing means, respectively, to thereby generate data X, and arithmetically operating said data R[N] and said data X to obtain a value for said data L[N+1] and set said data L[N] for said data R[N+1]; and wherein the data for determining the shift number is made to differ between at least two encrypting conversion processings.

13. A computer program for generating plain text data in which at least one key and encrypted text data are inputted, the inputted encrypted text is divided into a first data and a second data, said first data and said second data are set as a first initial data L[1] and a second initial data R[1], a decrypting conversion processing is repeated at least twice using the same function to receive data L[N] and data R[N] and output data L[N+1] and data R[N+1], respectively, wherein N is a natural number, and a combination of the two output data from a final stage of the decrypting conversion processing is provided as plain text, the computer program stored on a computer-readable medium and comprising:

instructions for performing a cyclic shift processing for performing a cyclic shift processing based on a shift number determined by data for determining a shift number, said shift number being independent from the plain text data;

instructions for performing at least once for said data L[N] a decrypting conversion processing by using said key and a cyclic shift processing using said cyclic shift processing means, respectively, to thereby generate data X, and arithmetically operating said data R[N] and said data X to obtain a value for said data L[N+1] and set said data L[N] for said data R[N+1]; and wherein the data for determining the shift number is made to differ between at least two decrypting conversion processings.

14. An encrypting conversion apparatus for inputting at least one cipher key and plain text data and outputting cipher text data, the encrypting conversion apparatus comprising:

a plurality of stages of encrypting conversion means for performing a first conversion for substituting different data for at least the plain text data and a second conversion for rearranging bits of the data, wherein said encrypting conversion means executes either an exclusive logical sum operation or ah addition operation of input data and first data generated from the cipher key, thereafter executes said first conversion and said second conversion, thereafter executes either an exclusive logical sum operation or an addition operation of the input data and second data generated from the cipher key, and thereafter executes said first conversion; and wherein encrypting conversion processing performed by said encrypting conversion means is repeated at least twice using the same function;

wherein the data for determining the shift number is made to differ between at least two encrypting conversion processings by said encrypting conversion processing means.

15. A decrypting conversion apparatus for inputting at least one cipher key and cipher text data and outputting plain text data, the decrypting conversion apparatus comprising:

a plurality of stages of decrypting conversion means for performing a first conversion for substituting different data for at least the cipher text data and a second conversion for rearranging bits of the data, wherein said decrypting conversion means executes either an exclusive logical sum operation or an addition operation of input data and first data generated from the cipher key, thereafter executes said first conversion and said second conversion, thereafter executes either an exclusive logical sum operation or an addition operation of the input data and second data generated from the cipher key, and thereafter executes said first conversion; and wherein decrypting conversion processing performed by said decrypting conversion means is repeated at least twice using the same function;

wherein the data for determining the shift number is made to differ between at least two decrypting conversion processings by said decrypting conversion processing means.

16. An encrypting conversion apparatus in which at least one key and plain text data are inputted, the inputted plain text is divided into a first data and a second data, said first data and said second data are set as a first initial data L[1] and a second initial data R[1], an encrypting conversion processing is repeated at least twice using the same function to receive data L[N] and data R[N] and output data L[N+1] and data R[N+1], respectively, wherein N is a natural number, and a combination of the two output data from a final stage of the encrypting conversion processing is provided as an encrypted text, comprising:

a cyclic shift processor, which performs a cyclic shift processing based on a shift number determined by data for determining a shift number selecting sequence, said shift number being independent from the plain text data, said cyclic shift processor including at least two different fixed cyclic shift processors, each of which performs cyclic shift by a fixed number of bits leftward or alternatively rightward, a cyclic shift processing selector, which selects said fixed cyclic shift processors, and a cyclic shift processing sequence determining device, which determines a selecting sequence for said cyclic shift processing selector on the basis of said data for determining a shift number selecting sequence; and an encrypting conversion processor, which performs at least once for said data L[N] a conversion processing by using said key and a cyclic shift processing using said cyclic shift processor, respectively, to thereby generate data X, and arithmetically operating said data R[N] and said data X to obtain a value for said data L[N+1] and set said data L[N] for said data R[N+1].

17. An encrypting conversion apparatus according to claim 16, wherein said cyclic shift processing sequence determining device is so arranged as to select at least two of said fixed cyclic shift processors in accordance with the sequence determined by said cyclic shift processing sequence determining means;

said cyclic shift processing sequence determining device being so arranged as to determine the cyclic shift processing sequence which differs from one to another stage of said encrypting conversion processor means in response to input values of bit strings of the data, respectively, for thereby determining said shift number, said input values of said bit strings differing from one to another stage of said encrypting conversion processor; and said encrypting conversion processor being so arranged as to perform block-based encrypting conversions which differ from one to another stage of said encrypting conversion processor.

18. An encrypting conversion apparatus according to claim 16, wherein said fixed cyclic shift processors are constituted by a wired logic circuit.

19. An encrypting conversion apparatus according to claim 16, wherein said cyclic shift processing selector is constituted by a multiplexer.

20. An encrypting conversion apparatus according to claim 16, wherein said cyclic shift processing sequence determining device is implemented by a cyclic shift processing sequence generating circuit which makes internal status transition in response to a synchronizing signal by using said cyclic shift determining data as initial values of international statuses and input signals for thereby outputting control input signals for said cyclic shift processing selector.

21. An encrypting conversion apparatus according to claim 16, wherein said fixed cyclic shift processors, said cyclic shift processor and said cyclic shift processing sequence determining device are each implemented in software.

* * * * *